(12) United States Patent
Schueneman et al.

(10) Patent No.: US 8,287,687 B1
(45) Date of Patent: Oct. 16, 2012

(54) CYANOACRYLATE COMPOSITIONS INCORPORATING ORGANIC MICROPULP

(75) Inventors: Gregory T. Schueneman, Scarborough, ME (US); Shabbir Attarwala, Simsbury, CT (US); Karen R. Brantl, West Springfield, MA (US)

(73) Assignee: Henkel Corporation, Rock Hill, CT (US)

( * ) Notice: Subject to any disclaimer, the term of this patent is extended or adjusted under 35 U.S.C. 154(b) by 329 days.

(21) Appl. No.: 12/603,110

(22) Filed: Oct. 21, 2009

Related U.S. Application Data

(60) Provisional application No. 61/107,428, filed on Oct. 22, 2008.

(51) Int. Cl.
- *C09J 4/00* (2006.01)
- *C09J 101/00* (2006.01)
- *C09J 201/00* (2006.01)
- *B32B 15/08* (2006.01)
- *B32B 27/00* (2006.01)

(52) U.S. Cl. .................. 156/331.4; 156/331.2; 428/461

(58) Field of Classification Search ............... 156/331.2, 156/331.4; 428/461
See application file for complete search history.

(56) References Cited

U.S. PATENT DOCUMENTS

| | | | |
|---|---|---|---|
| 2,794,788 A | 6/1957 | Coover et al. | |
| 2,999,788 A | 9/1961 | Morgan | |
| 3,018,091 A | 1/1962 | Duggins | |
| 3,692,752 A | 9/1972 | Setsuda et al. | |
| 3,767,756 A | 10/1973 | Blades | |
| 3,836,377 A | 9/1974 | Delahunty | |
| 3,869,429 A | 3/1975 | Blades | |
| 3,869,430 A | 3/1975 | Blades | |
| 4,105,715 A | 8/1978 | Gleave | |
| 4,170,585 A | 10/1979 | Motegi et al. | |
| 4,440,910 A | 4/1984 | O'Connor | |
| 4,450,265 A | 5/1984 | Harris | |
| 4,556,700 A | 12/1985 | Harris et al. | |
| 4,560,723 A | 12/1985 | Millet et al. | |
| 4,622,414 A | 11/1986 | McKervey | |
| 4,636,539 A | 1/1987 | Harris et al. | |
| 4,695,615 A | 9/1987 | Leonard et al. | |
| 4,718,966 A | 1/1988 | Harris et al. | |
| 4,798,720 A * | 1/1989 | Holder ........................... 424/61 |
| 4,837,260 A | 6/1989 | Sato et al. | |
| 4,855,461 A | 8/1989 | Harris | |
| 4,906,317 A | 3/1990 | Liu | |
| 5,026,456 A | 6/1991 | Hesler et al. | |
| 5,028,372 A | 7/1991 | Brierre et al. | |
| 5,209,877 A | 5/1993 | Frances et al. | |
| 5,312,864 A | 5/1994 | Wenz et al. | |
| 5,340,873 A | 8/1994 | Mitry | |
| 5,474,842 A | 12/1995 | Hoiness | |
| 5,605,999 A | 2/1997 | Chu et al. | |
| 6,192,892 B1 * | 2/2001 | Resler ........................... 132/200 |
| 6,294,629 B1 | 9/2001 | O'Dwyer et al. | |
| 6,475,331 B1 | 11/2002 | O'Connor et al. | |
| 6,822,052 B2 | 11/2004 | Woods et al. | |
| 6,833,196 B1 | 12/2004 | Wojciak | |
| 2003/0114641 A1 | 6/2003 | Kelly et al. | |
| 2004/0191192 A1 * | 9/2004 | Blankenbeckler et al. ..... 424/61 |

FOREIGN PATENT DOCUMENTS

WO  WO 2007/008971   *  1/2007

OTHER PUBLICATIONS

H.V. Coover, D.W. Dreifus and J.T. O'Connor, "Cyanoacrylate Adhesives" in *Handbook of Adhesives*, 27, 463-77, I. Skeist, ed., Van Nostrand Reinhold, New York, 3rd ed. (1990).

G.H. Millet, "Cyanoacrylate Adhesives" in *Structural Adhesives: Chemistry and Technology*, S.R. Hartshorn, ed., Plenun Press, New York, pp. 249-307 (1986).

* cited by examiner

*Primary Examiner* — Michael Orlando
(74) *Attorney, Agent, or Firm* — Steven C. Bauman

(57) ABSTRACT

The present disclosure provides a cyanoacrylate-based composition comprising a cyanoacrylate component and an organic micropulp component dispersed in a curable (meth) acrylic monomer matrix. The composition is particularly useful as an adhesive composition for zero gap applications.

11 Claims, No Drawings

CYANOACRYLATE COMPOSITIONS INCORPORATING ORGANIC MICROPULP

RELATED U.S. APPLICATION DATA

This application claims priority to U.S. Provisional Application No. 61/107,428, filed Oct. 22, 2008, the disclosure of which is hereby expressly incorporated herein by reference.

FIELD

The present disclosure provides a cyanoacrylate-based composition comprising a cyanoacrylate component and an organic micropulp dispersed in an acrylic or methacrylic matrix, and which is particularly useful as an adhesive composition for zero gap applications.

BRIEF DESCRIPTION OF RELATED TECHNOLOGY

Cyanoacrylate compositions have long been known as one component reactive adhesives, which are quick bonding and suitable for applications on variety of substrates. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenun Press, New York, p. 249-307 (1986).

A variety of fillers have been incorporated into cyanoacrylate adhesive compositions to bring about certain changes in properties. U.S. Pat. No. 2,794,788 teaches thickening of cyanoacrylate adhesives by dissolving therein quantities of polymeric alkyl cyanoacrylates, as well as other compounds including polyacrylates, methacrylates, and cellulose esters such as acetate, propionate, and butyrate.

U.S. Pat. No. 3,836,377 notes among the additional known thickeners polyvinyl ethers such as polyvinylmethyl ether. U.S. Pat. No. 3,692,752 discloses thickened cyanoacrylate solutions containing certain polyether acrylates/methacrylates, acrylic/methacrylic esters of bis(hydroxyalkyl) phosphoric acid derivates, and acrylic/methacrylic esters of tris (hydroxyalkyl) cyanuric acid derivatives.

U.S. Pat. No. 4,105,715 discloses a cyanoacrylate adhesive composition which incorporates powdered organic fillers such as polycarbonate, polyvinylidene fluoride, polyethylene, and acrylic block copolymer resins containing saturated elastomer segments.

U.S. Pat. No. 4,440,910 discloses a cyanoacrylate adhesive composition containing elastomeric polymers such as acrylic rubbers as fillers that exhibits substantially increased strength and toughness. While the use of these rubbers has resulted in large gains in fracture toughness, these gains are greatly diminished and may be eliminated at small gaps due to the restriction of the resultant enhanced plasticity in the adhesive bond line. This restriction is caused by the substrates. Cyanoacrylate adhesive compositions are commonly used in "zero" gap applications. "Zero" gap applications include applications wherein the substrates are positioned 3 mils or less with respect to each other. Thus the addition of the rubber in the adhesive material essentially results in the addition of a "structure" between the substrates. This "structure" interferes with the bond between the substrates and does not add any advantage to the adhesive in terms of fracture toughness.

U.S. Pat. No. 4,560,723 discloses a cyanoacrylate adhesive composition containing a toughener such as a core-shell thermoplastic/rubber copolymer which is treated to remove impurities which cause premature polymerization of the cyanoacrylates and a compatible organic compound having one or more aryl groups to provide improved retention of peel strength and toughness.

U.S. Pat. No. 5,340,873 teaches a cyanoacrylate composition where a high molecular weight polyester polymer is added therein to provide improved impact resistance and toughness with good flexibility.

U.S. Pat. No. 6,822,052 discloses a cyanoacrylate adhesive composition wherein an elastomeric copolymer is added to the cyanoacrylate monomer to increase the toughness of the adhesive upon cure.

U.S. Pat. No. 6,833,196 discloses a cyanoacrylate adhesive composition including an acrylic monomer toughening agent that has reduced acid generation, enhanced toughness, and faster fixturing speeds.

There continues to be a need for cyanoacrylate adhesive compositions that exhibit increased toughness, resulting in enhanced peel and shear strength, especially at zero to small gap applications.

SUMMARY

The present disclosure provides a toughened cyanoacrylate composition comprising a cyanoacrylate component and an organic micropulp component. Advantageously the cyanoacrylate composition further comprises a (meth)acrylate component. The organic micropulp component comprises fibrous organic material having a volume average length ranging from 0.01 micrometers to 100 micrometers, and/or an average surface area ranging from 25 to 500 square meters per gram. Such fibrous organic material may include an intermeshed combination of two or more of webbed, dendritic, branched, mushroomed or fibril structures. In one particular embodiment, the organic micropulp component comprises an aromatic polyamide fibrous organic material of poly-paraphenylene terephthalamide.

In another aspect, the present disclosure is directed to a method of preparing a toughened cyanoacrylate composition comprising: adding an organic micropulp component to a (meth)acrylate component to form a dispersion or premix and adding the premix to a cyanoacrylate component.

The cyanoacrylate composition of the present disclosure is particularly suitable for use as an adhesive, and may optionally further comprise a stabilizer. Such adhesives are particularly useful in the bonding of substrates in zero gap applications, where typical rubber tougheners can be ineffective. For the purposes of the present disclosure, "zero" gap applications represent bonding applications wherein substrates are positioned approximately 1-3 mils from one another or less.

In another aspect, the present disclosure is directed to a method of bonding two or more substrates including the steps of providing at least two substrates; applying onto at least a portion of a surface of one or both of the at least two substrates, a cyanoacrylate composition comprising a substantially homogeneous mixture of a cyanoacrylate component, an organic micropulp component and a curable (meth)acrylate component; contacting the surfaces of the at least two substrates having the cyanoacrylate composition therebetween; and curing the cyanoacrylate composition.

In another aspect, the present disclosure is directed to a zero gap bonded assembly including: a first substrate having a first surface, another substrate having a second surface, and a cured product of a cyanoacrylate composition bonding the first and second surfaces. The composition having included prior to cure, a cyanoacrylate component and a premix comprising an organic micropulp component dispersed in a curable (meth)acrylate matrix.

In another aspect, the present disclosure is directed to a method of increasing the peel strength and/or the shear strength of a cyanoacrylate composition by incorporating a material comprising an organic micropulp component into the composition, followed by curing of the composition.

DETAILED DESCRIPTION

The present disclosure provides a strengthened cyanoacrylate composition, which includes, beyond the cyanoacrylate component, an organic micropulp component and a curable (meth)acrylate component.

The cyanoacrylate compositions of the present disclosure include a cyanoacrylate component which includes at least one cyanoacrylate monomer. The cyanoacrylate is desirably an α-cyanoacrylate ester, such as those represented by the following structure:

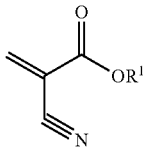

where $R^1$ represents a straight chain or branched chain alkyl group having 1 to 12 carbon atoms (which may be substituted with a substituent such as a halogen atom or an alkoxy group), a straight chain or branched chain alkenyl group having 2 to 12 carbon atoms, a straight chain or branched chain alkynyl group having 2 to 12 carbon atoms, a cycloalkyl group, an aralkyl group or any aryl group. Specific examples of $R^1$ are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-choroethyl group, a 3-choropropyl group, a 2-chorobutyl group, a trifluoroethyl group, a 2-methoxyethyl group, a 3-methoxybutyl group and a 2-ethoxyethyl group. Ethyl cyanoacrylate is a particularly desirable choice for use in the disclosed compositions.

A single α-cyanoacrylate monomer or a mixture of two or more of these α-cyanoacrylate monomers can be used. Generally, the above α-cyanoacrylate monomer is used alone as an adhesive, and one or more components such as those set forth below, are used to formulate a commercial composition. The additional components include, but are not limited to, accelerators; anionic polymerization inhibitors; radical polymerization inhibitors; additives, such as plasticizers, heat stabilizers and toughening agents; fillers; and/or perfumes, dyes, and pigments. The use of these additives is well known to those skilled in the art.

A suitable amount of cyanoacrylate monomer present in the disclosed composition is from about 50 to about 99.9% by weight, such as 60 to 99% by weight, desirably 85% by weight to about 98% by weight, based on the total weight of the composition.

The composition of the present disclosure further includes an organic micropulp component. The organic micropulp represents an organic material having a morphology which is micro-scale in length and nano-scale in diameter. More particularly, the organic micropulp has a volume average length ranging from 0.01 micrometers to 100 micrometers, preferably ranging from 0.1 micrometers to 50 micrometers and more preferably ranging from 0.1 micrometers to 10 micrometers. As used herein, the volume average length means:

$$\frac{\Sigma(\text{number of fibers of given length}) \times (\text{length of each fiber})^4}{\Sigma(\text{number of fibers of given length}) \times (\text{length of each fiber})^3}$$

Pulp particles differ from fibers by having a multitude of fibrils or tentacles extending from the body of each pulp particle. These fibrils or tentacles provide minute hair-like, anchors for reinforcing composite materials and cause the pulp to have a very high surface area. Generally, the organic micropulp has an average surface area ranging from 25 to 500 square meters per gram, preferably ranging from 25 to 200 square meters per gram and more preferably ranging from 30 to 80 square meters per gram.

The organic micropulp may be prepared through any process. In one embodiment, the organic micropulp may be formed from processing of organic fibers that are known in the art. For example, U.S. Patent Application Publication No. 2003/0114641 A1 (the disclosure of which is hereby expressly incorporated herein by reference) discloses a method of producing a dispersion of organic micropulp by agitating organic fibers with a solid component and a liquid component in order to convert the organic fibers into a micropulp of fibrous organic material. The organic fibers which are used for conversion into the micropulp can be in the form of continuous filament; short fibers either produced directly or cut from the continuous filament; pulp or fibrids.

Floc comprises generally short fibers made by cutting continuous filament fibers into short lengths without significant fibrillation; and the lengths of short fibers can be of almost any length, but typically they vary from about 1 mm to 12 mm for a reinforcing fiber and up to several centimeters for a staple fiber that is spun into a yarn. Short fibers suitable for use in the present disclosure are the reinforcing fibers disclosed in U.S. Pat. No. 5,474,842, which is incorporated herein by reference. An example of a typical floc having a useful physical structure includes 1.5 mm KEVLAR® 6F561 Floc supplied by DuPont Company, Wilmington, Del.

Pulp can be made by refining fibers to fibrillate the short pieces of the fiber material. Pulp can be also made by casting a polymerizing solution of polymer material and grinding and refining the solution, once solidified. Such a process is disclosed in U.S. Pat. No. 5,028,372. An example of a typical pulp having a useful physical structure includes KEVLAR® 1F361 supplied by DuPont Company, Wilmington, Del.

Fibrids are substantially sheet-like structures, which can be made in accordance with the process disclosed in U.S. Pat. Nos. 5,209,877, 5,026,456, 3,018,091 and 2,999,788, which are all incorporated herein by reference. The process includes adding a solution of organic polymer, with vigorous agitation, to a liquid, which is a non-solvent for the polymer and is miscible with the solvent of the solution, to cause coagulation of fibrids; the coagulated fibrids are wet milled and separated from the liquid; the separated fibrids are dried, by means appropriate, to yield clumps of fibrids having a high surface area; and the clumps are opened to yield a particulate fibrid product. The Product Information brochure identified as 11-67192 10/98 published by DuPont Canada Inc. in Mississauga, Ontario, CA illustrates the film like physical structure of typical fibrids known as F20W DuPont fibrids.

The organic fibers suitable for conversion into the organic micropulp fibrous material can be made of aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, or a mixture thereof. More preferred polymers are made from aromatic polyamides, polybenzoxadiazole, polyben-zimidazole, or a mixture thereof. Still more preferred organic fibers are aromatic polyamides ((p-phenylene terephthalamide), poly (m-phenylene isophthalamide), or a mixture thereof).

More particularly, the aromatic polyamide organic fibers disclosed in U.S. Pat. Nos. 3,869,430; 3,869,429; 3,767,756; and 2,999,788, all of which are incorporated herein by reference, are preferred. Such aromatic polyamide organic fibers and various forms of these fibers are available from DuPont Company, Wilmington, Del. under the trademark KEVLAR® fibers, such as KEVLAR® Aramid Pulp, 1 F543, 1.5 mm KEVLAR® Aramid Floc 6F561, DuPont NOMEX® aramid Fibrids F25W. Other suitable commercial polymer fibers include: ZYLON® PBO-AS (Poly(p-phenylene-2,6-benzobisoxazole) fiber, ZYLON® PBO-HM (Poly(p-phenylene-2,6-benzobisoxazole)) fiber, DYNEEMA® SK60 and SK71 ultra high strength polyethylene fiber, all supplied by Toyobo, JP. Celanese VECTRAN® HS pulp, EFT 1063-178, supplied by Engineering Fibers Technology, Shelton, Conn. CFF Fibrillated Acrylic Fiber supplied by Sterling Fibers Inc, Pace, Fla. Tiara Aramid KY-400S Pulp supplied by Daicel Chemical Industries, Ltd., 1 Teppo-Cho, Sakai City, JP.

The organic fibers for use in preparing the organic micropulp may also include natural fibers, such as cellulose, cotton and wool fibers, prior to being processed into the organic micropulp.

Organic micropulp may be dispersed in the cyanoacrylate component. Preferably, the organic micropulp is dispersed in a suitable carrier or matrix to form a dispersion or premix for addition to the cyanoacrylate component. In the context of the present disclosure, the matrix comprises a curable (meth) acrylate monomer. The organic micropulp may be dispersed directly within the (meth)acrylate matrix. Alternatively, the organic micropulp may be prepared as a dispersion or emulsion within a liquid component such as an aqueous liquid, one or more liquid polymers, one or more solvents, or a combination thereof. Such dispersions or emulsions may be combined with the (meth)acrylate matrix to form the organic micropulp dispersion/(meth)acrylate matrix for use with the cyanoacrylate component.

Desirably, the organic micropulp component is homogeneously dispersed directly within the (meth)acrylate matrix. The (meth)acrylate may be selected from (meth)acrylates that are liquid at the preparation or formulating temperature. For instance, examples of (meth)acrylate monomers suitable for use as the (meth)acrylate component in the present disclosure may be chosen from a wide variety of materials, such as these represented by $H_2C=CGCO_2R^8$, where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Mono-functional (meth)acrylates like hydroxyethyl(meth) acrylate ("HEMA"), hydroxypropyl(meth)acrylate ("HPMA"), isobornylacrylate ("IBOA"), and the like may be suitable for use herein, particularly in combination with a di- or tri-functional (meth)acrylate, as set forth below.

Additional (meth)acrylate monomers suitable for use herein include polyfunctional (meth)acrylate monomers, such as di- or tri-functional (meth)acrylates like polyethylene glycol di(meth)acrylates ("PEGDMA"), tetrahydrofuran (meth)acrylates and di(meth)acrylates, hexanediol di(meth) acrylate, trimethylol propane tri(meth)acrylates ("TMPTMA"), diethylene glycol dimethacrylate, triethylene glycol dimethacrylates ("TRIEGMA"), tetraethylene glycol di(meth)acrylates, dipropylene glycol di(meth)acrylates, di-(pentamethylene glycol) di(meth)acrylates, tetraethylene diglycol di(meth)acrylates, diglycerol tetra(meth)acrylates, tetramethylene di(meth)acrylates, ethylene di(meth)acrylates, neopentyl glycol di(meth)acrylates, and bisphenol-A mono and di(meth)acrylates, such as ethoxylated bisphenol-A (meth)acrylate ("EBIPMA"), and bisphenol-F mono and di(meth)acrylates, such as ethoxylated bisphenol-A (meth)acrylate.

Still other (meth)acrylate monomers that may be used herein include silicone (meth)acrylate moieties ("SiMA"), such as those taught by and claimed in U.S. Pat. No. 5,605, 999 (Chu), the disclosure of which is hereby expressly incorporated herein by reference.

Of course, combinations of these (meth)acrylate monomers may also be used.

The organic micropulp component may be present within the cyanoacrylate composition in an amount in the range of about 0.01% to about 10% by weight, desirably about 0.1% to about 2% by weight, more desirably about 0.5% by weight of the composition. This may be achieved by tailoring the amount of the organic micropulp dispersed within the (meth) acrylate matrix, in conjunction with the amount of the organic micropulp/(meth)acrylate matrix present with the cyanoacrylate composition. Desirably, the organic micropulp may be present in the (meth)acrylate matrix dispersion in an amount in the range of about 0.01% to about 30% by weight, desirably about 0.1% to about 10% by weight, more desirably about 1% to about 2% by weight. The amount of the organic micropulp/ (meth)acrylate matrix present within the cyanoacrylate composition may be in an amount in the range of about 1% to about 50% by weight, desirably about 2% to about 35% by weight, more desirably about 2% to about 25% by weight and advantageously about 2% to about 8% by weight.

An anionic polymerization inhibitor, i.e., a stabilizer, is generally added to α-cyanoacrylate compositions in an amount from about 0.0001% to about 10% by weight based on the total weight of the composition, to increase the stability of the composition during storage. The cyanoacrylate monomers are preferably stabilized using acid stabilizers of the Lewis or protonic types. Non-limiting examples of useful stabilizers include nitric oxide (NO), sulfur dioxide ($SO_2$), sulfur trioxide ($SO_3$), boron trifluoride ($BF_3$), hydrogen fluoride (HF), methane sulfonic acid (MSA), organic sultone inhibitors, aromatic sulfonic acids, aliphatic sulfonic acids, sulfones and mixtures and combinations thereof. The amount of inhibitor will suitably be any convenient amount in order to slow down cure of the composition. Desirably, inhibitors of anionic polymerization are present at about 0.0001% to about 0.1% by weight based on the total weight of the composition. In one particular embodiment, a stabilizer system for the present disclosure includes MSA and $SO_2$, for example with MSA in an amount from about 5 to about 30 ppm and $SO_2$ in an amount of from about 2 to about 30 ppm based on the amount of the cyanoacrylate monomer. In a further embodiment, $BF_3$ may be added in amounts of about 5 ppm to about 50 ppm based on the amount of the cyanoacrylate monomer. Advantageously, such small amounts of stabilizers used with the composition of the present disclosure provide optimal performance without stability concerns.

Further, a radical polymerization inhibitor may be added to the cyanoacrylate compositions as well, in an amount from about 0.001 to 2.0%, particularly 0.03 to 0.5%, based on the total weight of the composition, for the purpose of capturing radicals which are formed by light during storage. Such inhibitors are ordinarily of the phenolic type including, for example, hydroquinone and hydroquinone monomethyl ether. Other inhibitors suitable for use herein include butylated hydroxytoluene and butylated hydroxyanisole.

A thickener may be added to increase the viscosity of the cyanoacrylate composition; however, the graphite platelet material may exhibit a thickening effect to the composition, and therefore a thickener may not be desirable, particularly depending on the amount of aramid-based material incorporated into the composition. Nevertheless, various materials can be useful as thickeners, and examples include poly(methyl methacrylate), methacrylate-type copolymers, acrylic rubbers, cellulose derivatives, polyvinyl acetate and poly($\alpha$-cyanoacrylate). A suitable amount of thickener is generally about 0.01% to about 30% by weight, desirably about 5% to about 25% by weight based on the total weight of the composition.

Phthalic anhydride and other plasticizers may also be added to the cyanoacrylate component to further aid in durability and impact, heat and moisture resistance. The plasticizer is preferably present in an amount of about 0.05% to about 25%, desirably about 0.01% to about 5% by weight based on the total weight of the composition.

Perfumes, dyes, pigments and the like may be added to the disclosed composition depending on use purposed in amounts which do not adversely affect the stability of the cyanoacrylate monomer. The use of such additives is within the skill of those practicing in the cyanoacrylate adhesive art and need not be detailed herein.

Accelerators that may be useful in the cyanoacrylate compositions include for example calixarenes, oxacalixarenes, and combinations thereof. Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

Another potentially useful accelerator component is a crown ether. A host of crown ethers are known. For instance, examples which may be used herein either individually or in combination, or in combination with the calixarenes and oxacalixarenes described above include 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methyl-benzo-18-crown-6, 1,2-methylbenzo-5,6-methylbenzo-18-crown-6,1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated herein by reference.

Other suitable accelerators include those described in U.S. Pat. No. 5,312,864 (Wenz), which are hydroxyl group derivatives of an $\alpha$-, $\beta$- or $\gamma$-cyclodextrin which is at last partly soluble in the cyanoacrylate; in U.S. Pat. No. 4,906,317 (Liu), which are silacrown compounds to accelerate fixturing and cure on de-activating substrates such as wood, examples of which are within the following structure:

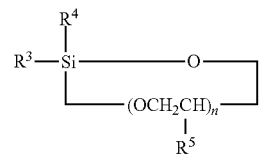

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups such as methoxy, and aryloxy groups such as phenoxy. The $R^3$ and $R^4$ groups may contain halogen or other substituents, an example being trifluoropropyl. However, groups not suitable as $R^4$ and $R^5$ groups are basic groups such as amino, substituted amino and alkylamino.

Specific examples of silacrown compounds useful in the disclosed compositions include:

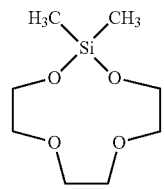

dimethylsila-11-crown-4;

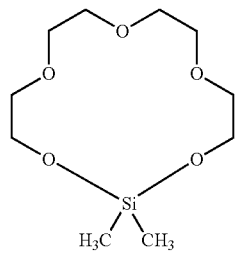

dimethylsila-14-crown-5; and

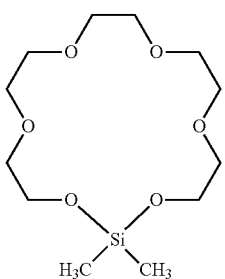

dimethylsila-17-crown-6.

The accelerator component may be included in the compositions in an amount within the range of from about 0.1% to about 10%, with the range of about 0.5% to about 5% being desirable. See e.g. U.S. Pat. Nos. 4,170,585; 4,450,265; 6,294,629; and 6,475,331, the contents of which are all incorporated herein by reference.

The presently preferred compositions do not include co-tougheners. However, it may be desirable in some applications to co-toughen the disclosed composition with a secondary toughening component. Useful secondary toughening components for use with cyanoacrylate compositions include elastomeric, i.e., rubbery, polymer; block copolymers constructed from polymethyl methacrylate ("PMMA") and polybutyl acrylate ("PB"); acrylic block copolymers; core shell rubber components; etc. When used, the co-toughener may be put in an amount of up to about 10% by weight, such as up to about 5% by weight, desirably below that 2% by weight to 4% by weight. Some applications may not receive a benefit from use of co-tougheners with the disclosed compositions and may see a decrease in some properties from use thereof.

The compositions of the present disclosure exhibit enhanced properties as compared to similar cyanoacrylate compositions which do not contain organic micropulp. Some enhanced properties of organic micropulp comprising cyanoacrylate compositions include improved 180° peel strength and tensile shear strength, which are indicative of useful bond strengths. Traditionally, nitrogen-containing components such as amides are not stable within cyanoacrylate compositions, causing the cyanoacrylate to cure prematurely. Surprisingly, it has been discovered through the present disclosure that cyanoacrylate compositions incorporating an amide component as an organic micropulp in the acrylic monomer matrix provides a composition which is stable, and which provides for a toughened adhesive composition without deleteriously affecting cure speed.

The cyanoacrylate compositions of the present disclosure are particularly useful in bonding two or more substrates at zero to small gap applications. A sufficient portion of the disclosed cyanoacrylate composition may be placed on a surface of one of the two or more substrates. The other substrate is then positioned over the cyanoacrylate composition and the two substrates contacted together to form an assembly. The assembly is then exposed to favorable cure conditions to cure the cyanoacrylate composition.

The composition of the present disclosure exhibits enhanced toughness, which is believed to be due to the inclusion of the organic micropulp, which provides for enhanced toughening properties when compared with corresponding compositions which do not include such a component. It has been found that the use of the organic micropulp component including nano-micrometer sized fibrous material has proven successful in toughening at "zero" gap applications without detrimental large increases in stability, viscosity, or dispensing capabilities. Other properties of the cyanoacrylate adhesive that are maintained or improved through the addition of such organic fibrous material therein include cure speed, thermal, solvent resistance, blooming, and shelf life of the adhesive.

The following examples are intended to illustrate, not limit, the disclosure.

EXAMPLE 1

Stability or Premixes Comprising Organic Micropulp and (Meth)Acrylate Component

Premixes were prepared by dispersing organic micropulp (poly-paraphenylene terephthalamide) in PEGDMA (polyethyleneglycol dimethacrylate); EBIPMA (ethoxylated bisphenol A dimenthacrylate) and EG (ethylene glycol). 1 part by weight of the premix was subsequently added to 100 parts by weight of ethyl cyanoacrylate (ECA) stabilized with boron trifluoride to form a cyanoacrylate composition. Dispersion stability and cyanoacrylate composition stability are summarized in the following Tables.

| | Stability of organic micropulp (poly-paraphenylene terephthalamide) dispersion in PEGDMA and cyanoacrylate compositions comprising these dispersions | | |
|---|---|---|---|
| sample | micropulp premix (% by weight) | premix stability | cyanoacrylate composition stability |
| 1 | 1.5% micropulp[1] (500 μm) in PEGDMA | dispersible | micropulp flocculated but was redispersible |
| 2 | 1.5% micropulp[1] (100 μm) in PEGDMA | dispersible | micropulp flocculated but was redispersible |
| 3 | 1.5% micropulp[1] (40 μm) in PEGDMA | dispersible | micropulp flocculated but was redispersible |
| 4 | 1.5% micropulp[1] (23 μm) in PEGDMA | dispersible | micropulp flocculated but was redispersible |
| 5 | 1.5% micropulp[1] (11 μm) in PEGDMA | dispersible | micropulp flocculated but was redispersible |
| 6 | 1.5% micropulp[1] (8 μm) in PEGDMA | dispersible | micropulp flocculated but was redispersible |

[1]KEVLAR micropulp available from Dupont.

The organic micropulp was readily dispersed in PEGDMA. Organic micropulp in the cyanoacrylate compositions did not sediment but flocculated in the center of the container. The organic micropulp was easily redispersed in the cyanoacrylate composition. The PEGDMA premix/cyanoacrylate compositions were stable at room temperature with no signs of gelling or curing after seven days. The cyanoacrylate composition comprising premix 6 was stable at 82° C. with no signs of gelling or curing after seven days. 1 part by weight of premix 6 was added to 100 parts by weight of LOCTITE 401™, a commercial cyanoacrylate product available from Henkel Corporation. The LOCTITE 401™ composition comprising premix 6 was stable at room temperature with no signs of gelling or curing after seven days.

| | Stability of organic micropulp (poly-paraphenylene terephthalamide) dispersion in EBIPMA and cyanoacrylate compositions comprising these dispersions | | |
|---|---|---|---|
| sample | micropulp premix (% by weight) | premix stability | cyanoacrylate composition stability |
| 7 | 1% micropulp[1] (500 μm) in EBIPMA | agglomeration | micropulp agglomerated and was not redispersible |
| 8 | 1% micropulp[1] (100 μm) in EBIPMA | agglomeration | micropulp agglomerated and was not redispersible |
| 9 | 1% micropulp[1] (43 μm) in EBIPMA | semi-dispersible | micropulp flocculated but was redispersible |
| 10 | 1% micropulp[1] (26 μm) in EBIPMA | semi-dispersible | micropulp flocculated but was redispersible |
| 11 | 1% micropulp[1] (15 μm) in EBIPMA | semi-dispersible | micropulp flocculated but was redispersible |

[1]KEVLAR micropulp available from Dupont.

The organic micropulp was not as easily dispersed in EBIPMA as in PEGDMA. EBIPMA/organic micropulp premixes comprising larger sized pulp (>45 μm) agglomerated in ECA and could not be dispersed. The agglomerated material did not affect stability of the cyanoacrylate composition. EBIPMA/organic micropulp premixes comprising smaller sized organic pulp (<45 μm) were more dispersible and the pulp did not sediment but flocculated in the center of the container. The organic micropulp was easily redispersed in the cyanoacrylate composition. The EBIPMA premix comprising cyanoacrylate compositions were stable at room temperature with no signs of gelling or curing after seven days. The cyanoacrylate composition comprising premix 11 was stable at 82° C. with no signs of gelling or curing after seven days. 1 part by weight of premix 5 was added to 100 parts by weight of LOCTITE 401™, a commercial cyanoacrylate product available from Henkel Corporation. The LOCTITE 401™ composition comprising premix 11 was stable at room temperature with no signs of gelling or curing after seven days.

Stability of organic micropulp (poly-paraphenylene terephthalamide) dispersion in EG and cyanoacrylate compositions comprising these dispersions

| sample | micropulp premix | premix stability | cyanoacrylate composition stability |
|---|---|---|---|
| 12 | 2% micropulp[1] (200 µm) in EG | agglomeration | micropulp became very dispersible in cyanoacrylate composition |
| 13 | 2% micropulp[1] (100 µm) in EG | agglomeration | micropulp became very dispersible in cyanoacrylate composition |
| 14 | 2% micropulp[1] (60 µm) in EG | difficult to disperse, flocculation | micropulp became very dispersible in cyanoacrylate composition |
| 15 | 2% micropulp[1] (40 µm) in EG | difficult to disperse, flocculation | micropulp became very dispersible in cyanoacrylate composition |
| 16 | 2% micropulp[1] (27 µm) in EG | difficult to disperse, flocculation | micropulp became very dispersible in cyanoacrylate composition |
| 17 | 2% micropulp[1] (22 µm) in EG | difficult to disperse, flocculation | micropulp became very dispersible in cyanoacrylate composition |
| 18 | 2% micropulp[1] (18 µm) in EG | difficult to disperse, flocculation | micropulp became very dispersible in cyanoacrylate composition |
| 19 | 2% micropulp[1] (16 µm) in EG | difficult to disperse, flocculation | micropulp became very dispersible in cyanoacrylate composition |

[1]KEVLAR micropulp available from Dupont.

The organic micropulp was difficult to disperse in EG with flocculation occurring in the container. The organic micropulp in the premix was readily dispersed in ECA. The EG premix/cyanoacrylate compositions were stable at room temperature with no signs of gelling or curing after seven days. The cyanoacrylate composition comprising premix 19 was stable at 82° C. with no signs of gelling or curing after seven days. 1 part by weight of premix 19 was added to 100 parts by weight of LOCTITE 401™, a commercial cyanoacrylate product available from Henkel Corporation. The LOCTITE 401™ composition comprising premix 19 was stable at room temperature with no signs of gelling or curing after seven days.

EXAMPLE 2

Adhesion of Cyanoacrylate Composition Comprising Premixes including Different Sizes of Organic Micropulp 1 part by weight of a selected PEGDMA/organic micropulp premix was added to 100 parts by weight of ECA stabilized with boron trifluoride to form a cyanoacrylate composition. Formulations were prepared in 30-ml HDPE Nalgene bottles and mixed manually for 2-3 minutes, followed by 30-60 minutes in an ultrasonicator bath. Mixed cyanoacrylate composition was applied to the test specimens. Adhesion of the cyanoacrylate compositions was tested on grit-blasted steel (GBS) lap shears and polycarbonate block (PC) shears after 24 hours of room temperature cure. A sample (A) comprising ECA stabilized with boron trifluoride and no organic micropulp was tested as a control. Results are shown in the following table.

Lap Shear Test
ASTM D1002
specimens: grit blasted mild steel (GBMS)
substrate thickness: 0.063 in.
bond thickness: zero gap
bond overlap: 1 inch×0.5 inches
testing rate: 0.05 in/min.
test temperature: 20° C. to 25° C.
Polycarbonate Block Shear Test
ASTM D4501
specimens: polycarbonate block
substrate size: 1 inch block
bond thickness: zero gap
bond overlap: 1 inch×0.5 inches
testing rate: 0.05 in/min.
test temperature: 20° C. to 25° C.

GBS lap shear adhesion of cyanoacrylate composition comprising premixes including different sizes of organic micropulp

| sample | Description | premix monomer | micropulp size (µm) | GBS Lap Shear Strength (psi) | ST Dev |
|---|---|---|---|---|---|
| A | ECA | — | — | 2218 | 287 |
| 20 | ECA/premix 1 | PEGDMA | 500 | 2707 | 56 |
| 21 | ECA/premix 2 | PEGDMA | 100 | 2627 | 166 |
| 22 | ECA/premix 3 | PEGDMA | 40 | 2486 | 210 |
| 23 | ECA/premix 4 | PEGDMA | 23 | 2622 | 319 |
| 24 | ECA/premix 5 | PEGDMA | 11 | 2825 | 314 |
| 25 | ECA/premix 6 | PEGDMA | 8 | 2790 | 146 |

PC block adhesion of cyanoacrylate composition comprising premixes including different sizes of organic micropulp

| sample | Description | premix monomer | micropulp size (µm) | PC Block Shear Strength (PSI) | St Dev |
|---|---|---|---|---|---|
| A | ECA | — | — | 1307 | 92 |
| 20 | ECA/premix 1 | PEGDMA | 500 | 1303 | 205 |
| 21 | ECA/premix 2 | PEGDMA | 100 | 1378 | 113 |
| 22 | ECA/premix 3 | PEGDMA | 40 | 1210 | 358 |
| 23 | ECA/premix 4 | PEGDMA | 23 | 1120 | 248 |
| 24 | ECA/premix 5 | PEGDMA | 11 | 1245 | 172 |
| 25 | ECA/premix 6 | PEGDMA | 8 | 1550 | 509 |

Adhesion of the cyanoacrylate control to grit-blasted steel was improved by the addition of 1 phr of organic micropulp PEGDMA premix, from about 2200 psi of the control to between about 2400 to about 2800 psi for organic micropulp containing cyanoacrylate compositions. Adhesion of cyanoacrylate compositions to polycarbonate was not significantly affected by the addition of 1 phr of any of the organic micropulp materials. Addition of organic micropulp premix did not significantly enhance or impede cure speed or adhesive development of cyanoacrylate composition at room temperature cure times less than 24 hours.

EXAMPLE 3

Adhesion of a Commercial Cyanoacrylate Compositions Comprising Premixes Including Different Sizes of Organic Micropulp and (Meth)Acrylate 1 part by weight of a selected (meth)acrylate/organic micropulp premix was added to 100 parts by weight of LOCTITE 401™ to form a cyanoacrylate composition. Formulations were prepared in 30-ml HDPE Nalgene bottles and mixed manually for 2-3 minutes, followed by 30-60 minutes in an ultrasonicator bath. Mixed cyanoacrylate composition was applied to the test specimens. Adhesion of the cyanoacrylate compositions was tested on grit-blasted steel (lap shears) and polycarbonate (block shears) after 24 hours of room temperature cure. A sample (B) of LOCTITE 401™ and no organic micropulp was tested as a control. Results are shown in the following table.

| sample | Description | premix monomer | micropulp size (μm) | GBS Lap Shear Strength (psi) | ST Dev |
|---|---|---|---|---|---|
| | GBS lap shear adhesion of commercial cyanoacrylate compositions comprising premixes including different sizes of organic micropulp and (meth)acrylate. | | | | |
| B | LOCTITE 401 control | — | — | 2954 | 124 |
| 26 | LOCTITE 401 + premix 1 | PEGDMA | 500 | 2723 | 250 |
| 27 | LOCTITE 401 + premix 6 | PEGDMA | 8 | 2774 | 175 |
| 28 | LOCTITE 401 + premix 19 | EG | 16 | 3216 | 214 |
| 29 | LOCTITE 401 + premix 11 | EBIPMA | 15 | 2889 | 193 |

| sample | Description | premix monomer | micropulp size (μm) | PC Block Shear Strength (PSI) | St Dev |
|---|---|---|---|---|---|
| | PC block adhesion of commercial cyanoacrylate compositions comprising premixes including different sizes of organic micropulp and (meth)acrylate. | | | | |
| B | LOCTITE 401 control | — | — | 1376 | 56 |
| 26 | LOCTITE 401 + premix 1 | PEGDMA | 500 | 1491 | 152 |
| 27 | LOCTITE 401 + premix 6 | PEGDMA | 8 | 1434 | 101 |
| 28 | LOCTITE 401 + premix 19 | EG | 16 | 1227 | 140 |
| 29 | LOCTITE 401 + premix 11 | EBIPMA | 15 | 1300 | 88 |

EXAMPLE 4

Adhesion of Cyanoacrylate Composition Comprising Different Amounts of 8 μm Organic Pulp in PEGDMA A series of cyanoacrylate compositions were prepared containing 100 phr ECA stabilized with 5 ppm boron trifluoride and 1, 2, 3.5, 5, 7.5, 10, 25 and 50 phr of premix 6 (1.5% Kevlar, 8 um length in PEGDMA) as shown in table below. Mixed cyanoacrylate composition was applied to the test specimens. Compositions were prepared in 30-ml HDPE Nalgene bottles and mixed manually for 2-3 minutes followed by manual shaking for 5 minutes. The Kevlar micropulp settled out within a few hours but were easily redispersed by shaking. Compositions containing 25 phr and 50 phr of premix 6 gelled within one hour of preparation and were remade in ECA stabilized with 20 ppm boron trifluoride. Both remade compositions remained stable.

The cyanoacrylate composition containing 10 phr of premix 6 thickened over 2 weeks of cold storage.

| sample | C | 30 | 31 | 32 | 33 | 34 |
|---|---|---|---|---|---|---|
| | cyanoacrylate compositions comprising ECA and premix 6 | | | | | |
| ECA[1] (phr) | 100 | 100 | 100 | 100 | 100 | 100 |
| premix 6 (phr) | — | 2 | 3.5 | 5 | 7.5 | 10 |

[1]ECA stabilized with 5 ppm boron trifluoride

| sample | D | 35 | 36 |
|---|---|---|---|
| | cyanoacrylate compositions comprising ECA and premix 6 (phr) | | |
| ECA[1] (phr) | 100 | 100 | 100 |
| premix 6 (phr) | — | 25 | 50 |

[1]ECA stabilized with 20 ppm boron trifluoride

Adhesion to GBS lap shears was determined after 30 min, 3, 6, and 24 hours of room temperature cure (RTC), the data is summarized in the table below.

GBS lap shear adhesion of cyanoacrylate composition comprising different amounts of 8 μm organic micropulp in PEGDMA.

| sample | premix 6 amt (phr) | GBS lap shear strength (psi) | St Dev | GBS lap shear strength (psi) | St Dev | GBS lap shear strength (psi) | St Dev | GBS lap shear strength (psi) | St Dev |
|---|---|---|---|---|---|---|---|---|---|
| | | 30 min cure | | 3 hour cure | | 6 hour cure | | 24 hour cure | |
| C | 0 | 1602 | 183 | 2071 | 159 | 2142 | 117 | 2569 | 191 |
| 30 | 2 | 1709 | 81 | 2101 | 62 | 2348 | 98 | 2441 | 97 |
| 31 | 3.5 | 1664 | 160 | 2124 | 101 | 2284 | 79 | 2469 | 141 |
| 32 | 5 | 1766 | 37 | 2151 | 114 | 2227 | 68 | 2783 | 61 |
| 33 | 7.5 | 1724 | 141 | 1994 | 213 | 2216 | 114 | 2840 | 122 |
| 34 | 10 | 1633 | 158 | 2078 | 154 | 2214 | 38 | 2641 | 103 |
| D | 0 | 67 | 18 | 1756 | 223 | 2123 | 136 | 2713 | 138 |
| 35 | 25 | 1363 | 114 | 1657 | 33 | 1785 | 209 | 2223 | 115 |
| 36 | 50 | 884 | 50 | 1156 | 100 | 1092 | 93 | 1408 | 33 |

Cure speed of the micropulp containing cyanoacrylate compositions remained comparable to the ECA control up to 10 phr of premix 6, after which cure speed decreased with increasing concentration, dropping by nearly 50% at 50 phr of premix 6. Surprisingly, 24-hour adhesion rose steadily with increasing concentration of premix 6, peaking at 7.5 phr of premix 6. At concentrations above 10 phr of premix 6, 24-hour adhesion decreased. The ECA control with 20 ppm boron trifluoride demonstrated very poor 30-minute adhesion as compared the ECA control with 5 ppm boron trifluoride but developed comparable adhesion after 24 hours of room temperature cure. Examination of the lap shears after testing revealed micropulp evenly dispersed throughout the bond area.

PC block adhesion of cyanoacrylate composition comprising different amounts of 8 μm organic micropulp in PEGDMA. 24 hr cure

| sample | premix 6 amt (phr) | PC block shear strength (psi) | St Dev | % increase |
|---|---|---|---|---|
| C | 0 | 1907 | 128 | — |
| 30 | 2 | 2392 | 80 | 25 |
| 31 | 3.5 | 2142 | 410 | 12 |
| 32 | 5 | 2871 | 243 | 51 |
| 33 | 7.5 | 3011 | 518 | 58 |
| 34 | 10 | 2386 | 253 | 25 |
| D | 0 | 2041 | 98 | — |
| 35 | 25 | 1855 | 173 | −9 |
| 36 | 50 | 1587 | 67 | −22 |

Adhesion to PC block shears was determined after 24 hours of room temperature cure. As observed on GBS, 24-hour adhesion surprisingly improved with increasing concentration of premix 6 up to 7.5 phr of premix 6, than decreased steadily at 10, 25 and 50 phr of premix 6.

EXAMPLE 5

Adhesion of Cyanoacrylate Composition Comprising Different Levels of 500 μm Organic Micropulp in PEGDMA A series of cyanoacrylate compositions were prepared containing 100 phr ECA stabilized with 5 ppm boron trifluoride and 1, 2, 3.5, 5, 7.5, 10, 25 and 50 phr of premix 1 (1.5% Kevlar, 500 um fiber length in PEGDMA) as shown in table below. A series of cyanoacrylate compositions were prepared containing 100 phr ECA stabilized with 5 ppm boron trifluoride and 1, 2, 3.5, 5, 7.5, 10, 25 and 50 phr of premix 11 (1% Kevlar, 15 um fiber length in EBIPMA) as shown in table below. Cyanoacrylate compositions comprising ECA stabilized with 5 ppm boron trifluoride and more than 10 phr of premix 1 were less stable than desirable for some applications. Three cyanoacrylate compositions based on 100 phr ECA stabilized with 20 pp boron trifluoride and more than 10 phr of premix 1 were also prepared and tested. The cyanoacrylate compositions are summarized in the table below.

Cyanoacrylate compositions comprising different levels of 500 μm organic micropulp in PEGDMA.

| sample (phr) | E | 37 | 38 | 39 | 40 | 41 | F | 42 | 43 | 44 |
|---|---|---|---|---|---|---|---|---|---|---|
| ECA (5 ppm BF3) | 100 | 100 | 100 | 100 | 100 | 100 | | | | |
| ECA (20 ppm BF3) | | | | | | | 100 | 100 | 100 | 100 |
| premix 1 | 0 | 1 | 2 | 3.5 | 5 | 7.5 | 0 | 10 | 25 | 50 |

A series of cyanoacrylate compositions were prepared containing 100 phr ECA stabilized with 5 ppm boron trifluoride and 1, 2, 3.5, 5, 7.5, 10, 25 and 50 phr of premix 11 (1% Kevlar, 15 um fiber length in EBIPMA) as shown in table below.

Cyanoacrylate compositions comprising different levels of 500 μm organic micropulp in EBIPMA

| sample | G | 45 | 46 | 47 | 48 | 49 | 50 | 51 | 52 |
|---|---|---|---|---|---|---|---|---|---|
| ECA (5 ppm BF3) | 100 | 100 | 100 | 100 | 100 | 100 | 100 | 100 | 100 |
| premix 11 | 0 | 1 | 2 | 3.5 | 5 | 7.5 | 10 | 25 | 50 |

All of the EBIPMA based cyanoacrylate compositions exhibited rapid curing and were not tested further.

Adhesive strength of the cyanoacrylate compositions on grit-blasted steel (GBS) at different room temperature cure times were tested. Results are summarized in the Table below.

GBS lap shear adhesion of cyanoacrylate compositions comprising different levels of 500 μm organic micropulp in PEGDMA.

| Sample | premix 1 amt (phr) | GBS lap shear strength (psi) | St Dev | GBS lap shear strength (psi) | St Dev | GBS lap shear strength (psi) | St Dev | GBS lap shear strength (psi) | St Dev |
|---|---|---|---|---|---|---|---|---|---|
| | | 30 min cure | | 3 hour cure | | 6 hour cure | | 24 hour cure | |
| E | 0 | 1328 | 119 | 1806 | 190 | 2018 | 205 | 1880 | 220 |
| 37 | 1 | 1288 | 78 | 1993 | 130 | 2018 | 128 | 1789 | 306 |
| 38 | 2 | 1250 | 84 | 1763 | 308 | 2122 | 101 | 1953 | 106 |
| 39 | 3.5 | 1198 | 234 | 1631 | 349 | 1920 | 172 | 1725 | 254 |
| 40 | 5 | 1042 | 378 | 2046 | 70 | 1893 | 79 | 1891 | 331 |
| 41 | 7.5 | 1247 | 147 | 1975 | 112 | 2057 | 120 | 2064 | 98 |
| F | 0 | 1263 | 136 | 2153 | 112 | 2315 | 150 | 2163 | 116 |
| 42 | 10 | 1338 | 77 | 2149 | 118 | 2011 | 132 | 2347 | 102 |
| 43 | 25 | 1219 | 64 | 1652 | 245 | 1796 | 240 | 1862 | 227 |
| 44 | 50 | 861 | 82 | 1151 | 31 | 997 | 81 | 938 | 100 |

Adhesion to grit blasted steel remains constant with increasing concentration of premix 1 up to 25 phr. At 50 phr, both cure speed by adhesive strength development and 24 hour adhesion of the ECA control were undesirable. Cyanoacrylate compositions comprising ECA with 20 ppm boron trifluoride developed greater adhesion on grit blasted steel than cyanoacrylate compositions comprising ECA stabilized with 5 ppm boron trifluoride.

Adhesive strength of the cyanoacrylate compositions on polycarbonate blocks after 24 hours room temperature cure was tested. Results are summarized in the Table below.

PC block adhesion of cyanoacrylate compositions comprising different levels of 500 μm organic micropulp in PEGDMA.

| Sample | premix 1 amt (phr) | PC block lap shear strength (psi) | St Dev | % increase |
|---|---|---|---|---|
| E | 0 | 1636 | 293 | — |
| 37 | 1 | 1922 | 441 | 18 |
| 38 | 2 | 1910 | 352 | 17 |
| 39 | 3.5 | 2600 | 651 | 59 |
| 40 | 5 | 2122 | 299 | 30 |
| 41 | 7.5 | 2754 | 315 | 68 |

PC block adhesion of cyanoacrylate compositions comprising different levels of 500 μm organic micropulp in PEGDMA.

| Sample | premix 1 amt (phr) | PC block lap shear strength (psi) | St Dev | % increase |
|---|---|---|---|---|
| F | 0 | 1262 | 243 | — |
| 42 | 10 | 1593 | 350 | 26 |
| 43 | 25 | 1584 | 454 | 26 |
| 44 | 50 | 2168 | 555 | 72 |

Significant increases in polycarbonate block adhesion strength of ECA based cyanoacrylate compositions were obtained from the addition of organic micropulp regardless of fiber size. Adhesion improved with increasing concentration of organic micropulp up to about 7.5 phr.

EXAMPLE 6

Peel Strength of Cyanoacrylate Composition Comprising a Commercial Cyanoacrylate Component and Premixes Including Different Sizes of Organic Micropulp and (Meth)Acrylate 1 part by weight of organic micropulp premix was added to 100 parts by weight of LOCTITE 401™ to form a cyanoacrylate composition. Compositions were prepared in 30-ml HDPE Nalgene bottles and mixed manually for 2-3 minutes, followed by 30-60 minutes in an ultrasonicator bath. 180 degree peel strength of the cyanoacrylate compositions was tested on grit blasted steel at zero gap after 2 days room temperature cure. A sample of LOCTITE 401™ and no organic micropulp was tested as a control. Results are shown in the following table.

180 degree Peel Strength Test
ASTM D903
specimens: grit blasted mild steel (GBMS)
substrate thickness: 0.032 in.
bond thickness: zero gap
testing rate: 10 in/min.
test temperature: 20° C. to 25° C.

Peel strength of cyanoacrylate compositions comprising a commercial cyanoacrylate component and premixes including different sizes of organic micropulp and (meth)acrylate.

| sample | Description | premix monomer | micropulp size (μm) | 180° Peel Strength (lbf/in) | St Dev |
|---|---|---|---|---|---|
| B | LOCTITE 401 control | — | — | 3.60 | 1.60 |
| 26 | LOCTITE 401 + premix 1 | PEGDMA | 500 | 12.90 | 5.27 |
| 27 | LOCTITE 401 + premix 6 | PEGDMA | 8 | 6.64 | 5.88 |
| 28 | LOCTITE 401 + premix 19 | EG | 16 | 4.27 | 0.91 |
| 29 | LOCTITE 401 + premix 11 | EBIPMA | 15 | 14.03 | 0.49 |

All of the premixes improved peel strength of LOCTITE 401. Premixes 11 and 1 improved the peel strength of LOCTITE 401 by 290% and 258%, respectively. Of the PEGDMA premixes, the cyanoacrylate composition containing the smallest fiber size (premix 6, 8 um) improved peel strength over the control by 84%; less than the cyanoacrylate composition containing the largest fiber size (premix 1, 500 um). An improvement in 180° peel strength of the control was generated by addition of 1 phr of premix 19. Both premix 11 and premix 19 contain micropulp of similar size (15 um vs. 16 um, respectively); however premix 19 contains 2% micropulp while premix 11 contains 1% micropulp.

Change in peel strength toughness of cyanoacrylate compositions comprising a commercial cyanoacrylate component and 1 phr of premixes including different sizes of organic micropulp and (meth)acrylate.

| sample | Description | change in peel strength from 401 control (%) |
|---|---|---|
| 26 | LOCTITE 401 + premix 1 | 258 |
| 27 | LOCTITE 401 + premix 6 | 84 |
| 28 | LOCTITE 401 + premix 19 | 19 |
| 29 | LOCTITE 401 + premix 11 | 290 |

EXAMPLE 7

Peel Strength of Cyanoacrylate Compositions comprising a Commercial Cyanoacrylate Component and Various Amounts of 500 μm or 8 μm Organic Pulp in PEGDMA Formulations Containing 7.5 Phr and 15 Phr of Premix 1 were Prepared in LOCTITE 401.

Cyanoacrylate compositions comprising a commercial cyanoacrylate component and various amounts of 500 μm or 8 μm organic pulp in PEGDMA.

| sample (phr) | H | 53 | 54 |
|---|---|---|---|
| LOCTITE 401 | 100 | 100 | 100 |
| premix 1 | — | 7.5 | 15 |

180 degree peel strength of the cyanoacrylate compositions was tested on grit blasted steel at zero gap after 2 days room temperature cure. Samples of LOCTITE 401™ with no organic micropulp were tested as a control. Results are shown in the following table.

Peel strength of cyanoacrylate compositions comprising a commercial cyanoacrylate component and various amounts of 500 μm organic pulp in PEGDMA.

| sample | Description | premix monomer | micropulp size (μm) | 180° Peel Strength (lbf/in) | St Dev |
|---|---|---|---|---|---|
| | LOCTITE 401 control[1] | — | — | 3.2 | 0.8 |
| 26 | LOCTITE 401 + 1 phr premix 1 | PEGDMA | 500 | 12.9 | 5.3 |
| 53 | LOCTITE 401 + 7.5 phr premix 1 | PEGDMA | 500 | 5.4 | 3.5 |
| 54 | LOCTITE 401 + 15 phr premix 1 | PEGDMA | 500 | 4.9 | 2.5 |

[1]average of results.

The addition of 1 phr premix 1 (sample 26) provided an increase in peel strength of 361%. Increasing concentration of premix 1 to 7.5 phr (sample 53) or 15 phr (sample 54) resulted in improvements to the control peel strength, (93% and 75%, respectively), but a lower peel strength than the 1 phr (sample 26) composition.

EXAMPLE 8

Fracture Toughness of Cyanoacrylate Composition comprising a Commercial Cyanoacrylate Component and 1 phr of Premixes including Different Sizes of Organic Micropulp and (Meth)Acrylate 1 part by weight of a selected (meth)acrylate/organic micropulp premix was added to 100 parts by weight of LOCTITE 401™ to form a cyanoacrylate composition. Formulations were prepared in 30-ml HDPE Nalgene bottles and mixed manually for 2-3 minutes, followed by 30-60 minutes in an ultrasonicator bath. Fracture toughness of the cyanoacrylate compositions was tested on anodized aluminum at zero gap after 8 days room temperature cure. A sample of LOCTITE 401™ and no organic micropulp was tested as a control. Results are shown in the following table.
Test Method: ASTM-D3433
Test Specimens: Aluminum tapered double cantilever beams (chromic acid anodized)
Cure Condition: eight days at room temperature
Replicates: four Fracture toughness of cyanoacrylate composition comprising a commercial cyanoacrylate component and 1 phr of premixes including different sizes of organic micropulp and (meth)acrylate.

| sample | Description | premix monomer | micropulp size (μm) | Critical Energy Release Rate | St Dev |
|---|---|---|---|---|---|
| | LOCTITE 401 control[1] | — | — | 617 | 56 |
| 26 | LOCTITE 401 + premix 1 | PEGDMA | 500 | 613 | 72 |
| 27 | LOCTITE 401 + premix 6 | PEGDMA | 8 | 485 | 21 |
| 28 | LOCTITE 401 + premix 19 | EG | 16 | 544 | 250 |
| 29 | LOCTITE 401 + premix 11 | EBIPMA | 15 | 483 | 35 |

[1]average of results

All samples exhibited a cohesive failure mode.

What is claimed is:

1. A cyanoacrylate composition consisting essentially of:
(a) a cyanoacrylate component; and
(b) an organic micropulp component dispersed in a curable (meth)acrylate matrix,
wherein the organic micropulp component/curable (meth) acrylate matrix dispersion is present in an amount in the range of about 2% by weight to about 10% by weight;
wherein the organic micropulp component comprises fibrous organic material having a volume average length ranging from 0.01 micrometers to 100 micrometers and an average surface area ranging from 25 to 500 square meters per gram;
wherein the organic micropulp component is made from poly-paraphenylene terephthalamide; and
wherein the (meth)acrylate in which the organic micropulp component is dispersed is polyethyleneglycol di(meth) acrylate.

2. The composition of claim 1, wherein the cyanoacrylate component comprises a compound represented by the formula:

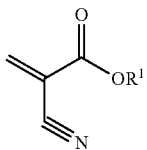

wherein $R^1$ represents a straight chain or branched chain substituted or unsubstituted alkyl group having 1 to 12 carbon atoms, a straight chain or branched chain substituted or unsubstituted alkenyl group having 2 to 12 carbon atoms, a straight chain or branched chain substituted or unsubstituted alkynyl group having 2 to 12 carbon atoms, a substituted or unsubstituted cycloalkyl group, an substituted or unsubstituted aralkyl group or a substituted or unsubstituted aryl group.

3. The composition of claim 2, wherein $R^1$ is selected from the group consisting of a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-choroethyl group, a 3-choropropyl group, a 2-chorobutyl group, a trifluoroethyl group, a 2-methoxyethyl group, a 3-methoxybutyl group, a 2-ethoxyethyl group and combinations thereof.

4. The composition of claim 1, wherein the cyanoacrylate component comprises an ethyl cyanoacrylate monomer.

5. The composition of claim 1, wherein the organic micropulp component is present in an amount in the range of about 0.2% by weight to about 0.1% by weight.

6. The composition of claim 1, wherein the organic micropulp component comprises a fibrous organic material including an intermeshed combination of two or more of webbed, dendritic, branched, mushroomed or fibril structures.

7. The composition of claim 1, further comprising a stabilizer.

8. The composition of claim 1, further comprising a stabilizer selected from the group consisting of methane sulfonic acid (MSA), $SO_2$ and $BF_3$.

9. The composition of claim 1, further comprising an additive selected from the group consisting of accelerators, plasticizers, fillers, opacifiers, thickeners, viscosity modifiers, inhibitors, thixotropy conferring agents, dyes, thermal degradation enhancers, and combinations thereof.

10. The composition of claim 1, further comprising a co-toughener selected from the group consisting of elastomeric polymers of a lower alkene monomer and (i) acrylic acid esters, (ii) methacrylic acid esters or (iii) vinyl acetate reaction product of the combination of ethylene, methyl acrylate and monomers having carboxylic acid cure sites, which once formed is then substantially free of processing aids and antioxidants, reaction products of the combination of ethylene, methyl acrylate and monomers having carboxylic acid cure sites, dipolymers of ethylene and methyl acrylate, polymer component, constructed from polymethyl methacrylate and polybutyl acrylate segments and combinations thereof.

11. A method of bonding two or more substrates in a zero gap application, said method comprising the steps of:
providing at least two substrates;
dispensing on a surface of one or both of the at least two substrates a cyanoacrylate adhesive composition comprising:
(a) a cyanoacrylate component; and
(b) an organic micropulp component dispersed in a curable (meth)acrylate matrix;
contacting the surfaces of the at least two substrates having the cyanoacrylate adhesive composition thereon; and
exposing the cyanoacrylate adhesive composition to cure conditions;
wherein the cured cyanoacrylate demonstrates an improved peel strength when compared to a similar cyanoacrylate adhesive composition without the organic micropulp component included therein;
wherein the organic micropulp component/curable (meth) acrylate matrix dispersion is present in an amount in the range of about 2% by weight to about 10% by weight;
wherein the organic micropulp component comprises fibrous organic material having a volume average length ranging from 0.01 micrometers to 100 micrometers and an average surface area ranging from 25 to 500 square meters per gram;
wherein the organic micropulp component is made from poly-paraphenylene terephthalamide; and
wherein the (meth)acrylate in which the organic micropulp component is dispersed is polyethyleneglycol di(meth) acrylate.

* * * * *